Feb. 20, 1962   V. J. FOWLER   3,022,443
FOLDED TRANSMISSION LINE AND TUBE
Filed May 9, 1955   5 Sheets-Sheet 1

Inventor:
Vernon J. Fowler,
By Merriam & Lorch,
Attys.

Feb. 20, 1962

V. J. FOWLER

3,022,443

FOLDED TRANSMISSION LINE AND TUBE

Filed May 9, 1955

United States Patent Office 3,022,443
Patented Feb. 20, 1962

3,022,443
FOLDED TRANSMISSION LINE AND TUBE
Vernon J. Fowler, Bayside, N.Y., assignor to University of Illinois Foundation, Urbana, Ill.
Filed May 9, 1955, Ser. No. 506,756
14 Claims. (Cl. 315—39.3)

This invention relates to a new type of transmission line configuration for use in applications which require either a long constant electrical length confined in a small space or a high characteristic impedance or both. The invention is particularly well adapted for use as one or more of the distributed elements in a transmission-line tube, in which application the transmission line also serves the additional functions of controlling and intercepting the electrons which accomplish the amplification obtained in such a tube.

It has heretofore been attempted to use helical or modified helical configurations as transmission lines, delay lines, or transmission line tube elements to meet the requirement of long constant electrical length or high impedance or both. However, in applications where such constant electrical length is essential the elementary helix is unsuitable because the electrical length of a helix is not constant but varies with frequency. Where the compensated helical delay line is employed the complexity and expensiveness of the structure and the fact that the compensation method has not been shown to be practical for delay lines which are required to handle very short-duration pulses, for which the bandwidth must be very large, has proved them to be unsatisfactory.

Furthermore, numerous other difficulties are encountered in attempting to utilize helices or other known devices as transmission-line tube electrodes. The mere configuration of such an electrode made it essential that the diameter of the helix be relatively large. Furthermore, the coil forms for the various electrodes would all have to be hollowed out so that the electrodes could be fit inside one another, and they would have to be slotted or perforated to allow passage of the electron stream. This required even greater helix diameters than those needed merely to obtain rigidity.

Ordinary circular helices of the required diameters are severely limited in their bandwidth capabilities and it is necessary to revert to more complicated types of windings to produce the desired characteristics from an uncompensated wire-wound structure. The use of compensated structures similar to those used in delay-line applications is impracticable because of the very large bandwidths involved.

Furthermore, the helix is not a constant-velocity structure, and consequently the time delays involved in propagating long-duration and short-duration pulses through a helical transmission-line tube amplifier would be slightly different.

Only a small portion of a helical transmission-line tube grid could be utilized to control an electron stream owing to the fact that at least half of the total length of the grid wire has to be in contact with the insulating coil form.

The helical transmission-line tube must be provided with two sets of terminals at opposite ends of the vacuum envelope. This entails considerable complication, expense, and loss of convenience.

The presence of the relatively massive insulating coil forms in close proximity to the cathode along the full length of the tube presents considerable technological difficulties, especially with reference to thermal aspects of the design.

Applicant has overcome the foregoing and other disadvantages by employing a squirrel-cage folded transmission line. Such a line is not only more efficient where extremely large bandwidths are involved, that is, a larger product of impedance and bandwidth can be achieved but provides a constant velocity structure that is quite free of time delay distortion and is considerably more free from production problems than earlier attempts. Such a line can be single-ended with all connections made through one end.

The principle of the squirrel-cage folded transmission line utilized to achieve increased impedance over its unfolded counterparts is that of arranging the active conductors or conductor portions in parallel relation (folded) physically connecting the external input and output circuits of the device each to only one of the several active wires of the structure and coupling to the other wires of the structure chiefly by means of series interconnections at the two ends of the active conductors. Under certain conditions the folded transmission line can be made electrically equivalent to an ordinary unfolded transmission line, except that the characteristic impedance is greatly increased.

The active elements of the ideal folded transmission line must all be of the same cross-sectional size and shape and they must be symmetrically disposed about the center conductor. This in turn requires that the cross-section of the center conductor be a circle, regular polygon, or some other shape having a polygonal symmetry. Folded transmission lines can also be constructed in which these symmetry conditions are not fulfilled, but the performance would be inferior to that obtained from an ideal folded transmission line by an amount which would vary directly with the degree of departure from the exact symmetry conditions.

Propagation along a multiple transmission line consisting of a number of parallel portions comprising wires or cylinders (circular or otherwise), can be described in terms of electromagnetic waves traveling between opposite ends of the conductors. It is a well-known characteristic of this general class of structures that if the conductors are substantially lossless and if the greatest distance between conductors is small compared with a quarter wavelength, then these electromagnetic waves will all travel along the structure with a phase velocity equal to the velocity of light. This is true irrespective of the shape of the cross-sections of the conductors and irrespective of the configuration, as long as the multiple transmission line consists entirely of parallel cylinders.

It is a unique property of the symmetrical squirrel-cage folded transmission line that this structure can be made to propagate in such a manner that the current in the active elements consists entirely of single forward-traveling wave which follows the contour of the wire. The absence of standing waves of current on the structure enables one to connect this multiple transmission line to external circuitry in such a manner that it exhibits a constant effective electrical length equal to the total length of the several parallel wires. Such a line also exhibits a greatly increased impedance.

A better understanding of this invention will be had from the following description when considered in connection with the accompanying drawings in which.

Figure 1:
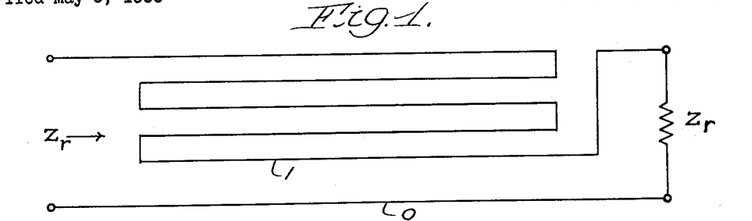
FIGURE 1 is a schematic illustration of a series connected five-wire multiple transmission line.

In actual form the symmetrical squirrel-cage folded transmission line is similar to a parallel cylinder multiple transmission line in which the conductors or active conductor portions are connected in series and the conductors can be numbered with number 1 being assigned to the output conductor. The receiving end of the line is terminated by means of an initially unspecified impedance $Z_r$ connected between line 1 and the return wire 0 as shown in FIGURE 1.

The voltages and currents on the various conductors can each be represented by two components, one representing the forward propagation and one representing the backward propagation. Thus, if the number of elements (not including a common return conductor) is N, then the total number of voltage and current components is 4N. However, the multiple transmission-line equations are 2N equations which interrelate the voltages and currents on the wires in terms of the self and mutual inductances and capacitances per unit length of line. If all the current components are known, the multiple transmission-line equations determine all the voltage components, and vice versa. In general, the existence of each current component contributes to every voltage component, and vice versa. In all cases, however, the total number of independent forward and backward components required to describe the propagation is 2N. These 2N components are uniquely determined by 2N "boundary conditions" at the two ends of the line, that is, by 2N equations which describe the particular manner in which the wires are connected to each other and to external circuits. In general, all or nearly all of these voltage and current components will be different from zero.

The 2N boundary conditions for such a structure are readily expressed in words. Each of the interconnections imposes two conditions: the voltages of the two interconnected wires are equal at the point of junction, and the currents are equal in magnitude but opposite in direction at the junction. Since the number of interconnections is $N-1$, two additional conditions are required to determine the 2N components which described the propagation. One of these conditions is that the ratio of voltage to current on line 1 at the output end equals the terminating impedance $Z_r$. The last condition is that the phase velocity be one of the roots of the "characteristic determinant" of the structure. Since the structure is cylindrical, this determinant has only one root, namely the velocity of light. Setting the phase velocity equal to the velocity of light thus satisfies the last of the 2N boundary conditions.

Figure 3:
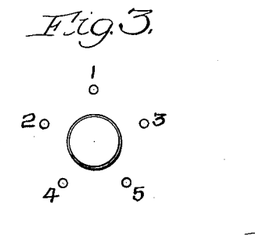
FIGURES 3 and 4 are schematic end elevations of two types of five-wire squirrel-cage folded transmission lines which satisfy symmetry conditions.

If we were dealing with a structure of specified geometry, the remaining $2N-1$ boundary conditions would predetermine the distribution of currents on the wires. But, since the structure has been only partly specified, it is possible to make assumptions concerning that current distribution which might be satisfied by some unknown configuration. Thus, the assumption can be made that the backward components of current are zero on the odd-numbered wires and the forward components of current are zero on the even-numbered wires (FIG. 3). The boundary conditions that the currents be equal and opposite at the interconnections then require that if such a structure exists for which the assumption is true, then the currents on the various wires must all be part of a single traveling wave of current which follows the contour of the wire. This, of course, determines the currents in all of the wires in terms of the current in any one of them. In particular, if the structure is lossless, the currents are all equal in amplitude but differ in phase by an amount directly proportional to the length of wire between the points in question.

The voltages are not yet determined, because the structure is unspecified. It is desired to specify the structure in such a manner that the remaining boundary conditions are automatically satisfied. The boundary conditions on voltage at the interconnections are all satisfied by certain sets of symmetry conditions. These symmetry conditions are different for different numbers of elements, but they all represent the same sort of symmetry. For example, the symmetry conditions for a five-wire line are:

$$z_{11}=z_{22}=z_{33}=z_{44}=z_{55}$$
$$z_{12}=z_{13}=z_{24}=z_{35}=z_{45}$$
$$z_{14}=z_{15}=z_{25}=z_{34}=z_{23}$$

In these equations the $z$'s are the distributed self and mutual series impedances per unit length of line. For a lossless line they are all proportional to the corresponding distributed inductances per unit length.

Figure 2:
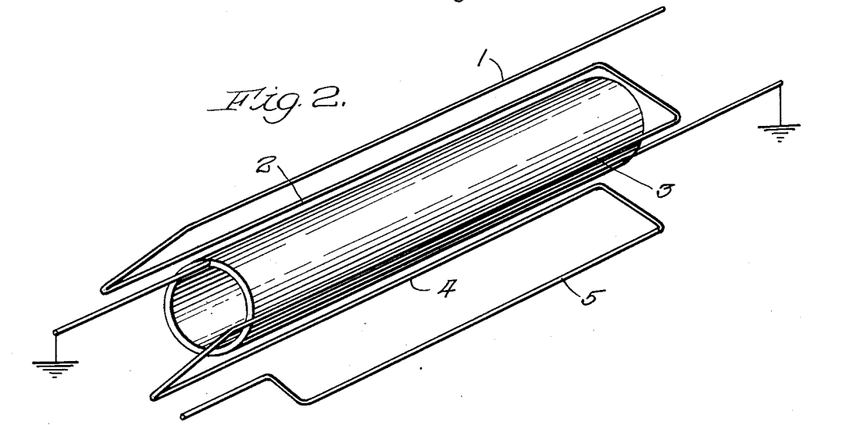
FIGURE 2 is a schematic illustration of a five-wire squirrel-cage folded transmission line.
Figure 4:
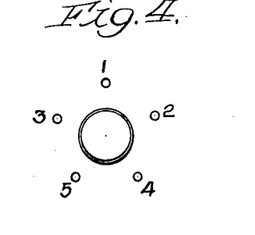

A squirrel-cage folded transmission line, the counterpart of that shown in FIGURE 1, is illustrated in FIGURES 2, 3 and 4. As can be seen from FIGURES 3 and 4 in particular, the symmetry conditions are all satisfied in a structure consisting of five conductors located on the edges of a regular pentagonal cylinder, the return conductor being a circular cylinder concentric with the pentagonal cylinder. However, it is necessary that the numbering of the conductors be in accordance with one of the two schemes presented in FIGURES 3 and 4. These schemes are equivalent to each other. When combined with the interconnection pattern of FIGURE 1 to which they correspond, they are both equivalent to the squirrel-cage folded transmission line depicted in FIGURE 2. The difference between the two numberings given in FIGURES 3 and 4 is that the one would represent a left-hand winding of the wire lengthwise about the center cylinder, whereas the other would represent a right-hand winding.

It can be seen that reversing the positions of any two wires in either of the two configurations of FIGURES 3 and 4 yields a configuration which does not satisfy the symmetry conditions.

The symmetry conditions for other numbers of elements are similar to those for five elements, and in all cases (whether that number N is odd or even) the symmetry conditions are satisfied by a symmetrical squirrel-cage folded transmission line consisting of a center circular cylinder and a wire wound lengthwise along the edges of a regular polygonal cylinder of N sides.

The symmetry conditions are also satisfied if the conductors are not round wires but cylinders of arbitrary cross sections. However, it is necessary that the cross sections of all N conductors be the same size and shape, and they must be oriented in such a manner that they can be made to coincide with one another if they are revolved about the axis of the return conductor. Of course, they must also be equally spaced around the center conductor, and they must be small enough so that they do not intersect or touch each other or the center conductor.

The center conductor itself need not be a circular cylinder; it can also be an N-sided regular polygonal cylinder or any other polysymmetrical cylinder whose axis of symmetry coincides with the axis of symmetry of the N conductors. The structure can also include one or more additional sets of N cylindrical conductors of the same cross section, arranged symmetrically relative to the first folded transmission line elements. However, the members of each of these sets must all be terminated in the same manner as all other members of the same set; that is, if one member is grounded, all N members must be grounded, etc. The entire structure can also be contained in a polysymmetrical cylindrical conductor, which could serve as an electromagnetic shield.

The one remaining boundary condition (that the ratio of voltage to current at the output is $Z_r$ when the line is propagating the desired traveling wave of current) is satisfied by an appropriate choice of $Z_r$ itself. This value is arrived at in a straightforward manner by calculating the voltage at the receiving end from the known currents on the various wires and taking the ratio of that voltage to the current on line 1. Since the relationship between voltages and currents depends only upon the distributed inductances and capacitances of the multiple transmission line, $Z_r$ is a characteristic of the line itself.

In ordinary two-wire transmission lines the desired current distribution is a single forward-traveling wave with zero propagation in the reverse direction, that is, zero reflection of the desired forward wave. Reflection is prevented in two-wire lines by choosing a terminating impedance equal to the characteristic impedance of the line, a quantity which, like $Z_r$, is determined by the cross-sectional dimensions of the line. Termination of a two-wire line in its characteristic impedance (impedance matching) causes the ratio of voltage to current at all points of the line to be equal to the characteristic impedance. The impedance presented to the input terminals of a matched two-wire line is the characteristic impedance itself. However, the impedance presented to the input terminals of a matched folded transmission line is a quantity $Z_s$ which differs from $Z_r$, the output impedance. For lossless lines $Z_r$ and $Z_s$ are complex conjugates of each other. That is, $$Z_r = R_0 + jX_c$$
$$Z_s = R_0 - jX_c$$

where $j$ is the imaginary unit, and $R_0$ represents a resistance and $X_c$ represents a reactance.

Figure 5:
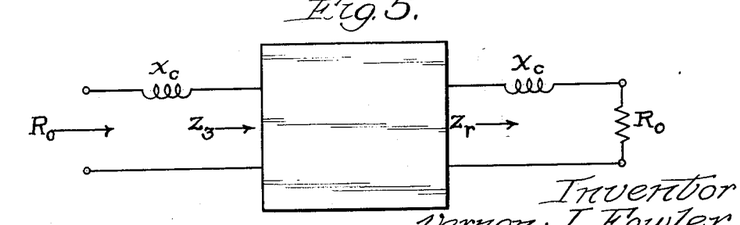
FIGURE 5 is a schematic diagram of a five-wire symmetrical squirrel-cage folded transmission line showing the use of compensating reactors.

In order to obtain a structure having equal and real input and output characteristic impedances, compensating reactors $X_c$ are connected between the ends of the folded transmission line and the input and output terminals, as shown in FIGURE 5. It is seen that the relationships between $Z_r$, $Z_s$, $R_0$ and $X_c$ given in the above equations are satisfied in FIGURE 5. The quantity $R_0$, the real part of $Z_r$ and $Z_s$, is thus the characteristic impedance of the folded transmission line.

Thus, the symmetrical squirrel-cage folded transmission line used in conjunction with compensating reactors is the electrical equivalent of a two-wire transmission line. It has a constant electrical length equal to the total length of the series-connected wires, and when terminated in its characteristic impedance it presents that same impedance to the input terminals.

Figure 6:
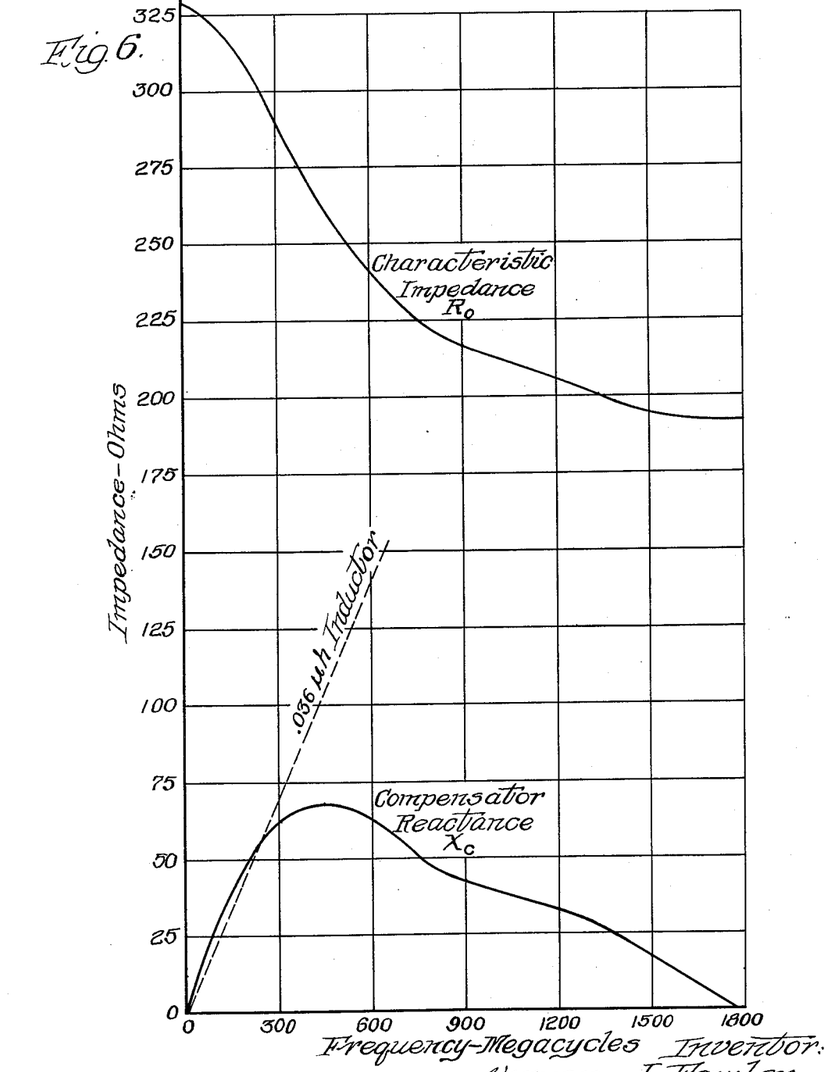
FIGURE 6 is a graph showing characteristic impedance and compensator reactance curves of a nine-wire folded transmission line.
Figure 7:
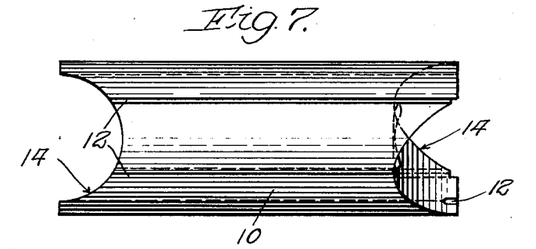
FIGURE 7 is a side elevation of a cuspated cylinder coil form for a six-wire folded transmission line.
Figure 8:
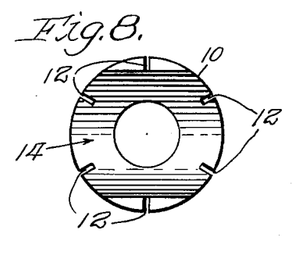
FIGURE 8 is a top plan view of the coil form shown in FIGURE 7.
Figure 9:
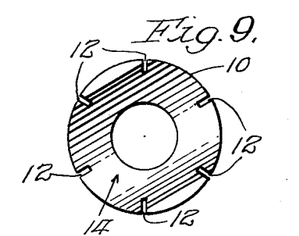
FIGURE 9 is a bottom plan view of the form shown in FIGURE 7.
Figure 10:
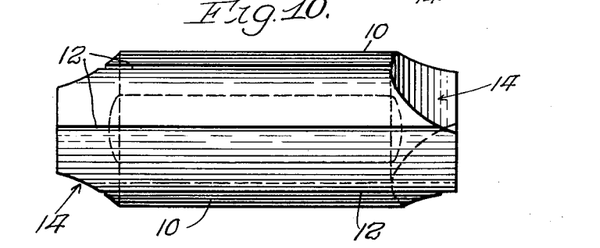
FIGURE 10 is another side elevation of the cylinder coil form.

The calculated values of $R_0$ and $X_c$ for a nine-wire lossless squirrel-cage folded transmission line are illustrated in the curves of FIGURE 6. The dimensions of the structure to which they apply are also given in the figure along with a cross-sectional view of the line. The characteristic impedance and compensator reactance are both periodic functions of frequency, the period in this case being 3600 megacycles. This is the frequency for which the free-space wavelength equals twice the length of a single element of the folded transmission line. The plots show the first half period, extending from zero to 1800 megacycles. The characteristic impedance is symmetrical about zero and 1800 megacycles, and the compensator reactance is antisymmetrical about these two points.

For frequencies below about 300 megacycles pure inductances can be used as compensating reactors. The half-power point occurs at a much higher frequency, about 700 megacycles. The practical bandwidth of a low-pass device is commonly regarded as the frequency at which the power output is one half of the maximum value it attains below that frequency. Thus, the ultimate bandwidth of this particular structure is 700 megacycles. If ordinary inductors are used as compensators a smaller bandwidth of about 300 megacycles would be obtained. A more complicated type of reactor, such as a resonant coil, could be used to approximate $X_c$ over the entire 700 megacycle range.

The actual shape of the characteristic impedance curve depends primarily upon the ratio of the spacing between adjacent elements to the spacing between each of the elements and the center conductor. If this ratio is very small, that is, if the elements are crowded closely together and well spaced from the center conductor, then the curve will fall rapidly to a very low impedance level, whereas if the elements are quite widely spaced from each other and close to the center conductor, then the impedance curve will be more nearly horizontal. In fact, if the spacing between adjacent elements is large enough the entire characteristic impedance curve will be located above the half-power point, and the practical bandwidth of the device will be determined entirely by losses in the conductor and in the dielectric medium. In this case a perfectly lossless folded transmission line would have an infinite bandwidth as does a lossless two-wire line.

The maximum impedance of the folded transmission line occurs at zero frequency and is exactly N times the characteristic impedance of the same structure with the elements connected in parallel. Thus, the characteristic impedance can be made as large as desired by making the number of elements N large enough. However as the number of elements is increased indefinitely the spacing between adjacent elements gets very small, and the characteristic impedance curve becomes very narrow. The reason for this is easily seen by considering the fact that the close proximity of the adjacent elements gives rise to large capacitances between elements. These capacitances would tend to prevent the maintenance of large differences of potential between the various wires at high frequencies. In effect the capacitances between elements would tend to couple all the elements in parallel, transforming the structure from a series-connected folded transmission line at low frequencies into a parallel-connected line at medium and high frequencies. The impedance of the parallel-connected line is only $1/N$ times as great as that of the folded line, and therefore the minimum impedance achieved by the structure would be very small compared with the maximum impedance, especially if the number elements is very great. Since the shunting effect of the capacitive coupling between turns is proportional to the existent impedance level, it follows that extremely high impedance levels could be maintained only at very low frequencies. On the other hand, moderately large impedance levels can be maintained up to quite high frequencies.

One might expect that as the number of elements of a folded transmission line is increased the bandwidth would decrease in inverse proportion, but fortunately this is not true, except where extremely high maximum impedances are involved. In folded lines designed for characteristic impedances of 300 ohms or less the distance between adjacent elements is generally large compared with the minimum distance between each element and the center conductor. Therefore, the current in each element is in close proximity to an equal and opposite return current in the center conductor. Consider two such elements separated by a large distance compared with the distance between each element and the center conductor. The coupling between the two elements caused by a forward current in one of the elements is almost exactly equal to the coupling caused by the accompanying return current.

The net coupling is the difference, which is practically zero. Thus, appreciable coupling occurs only between neighboring elements, say between an element and each of its six closest neighbors. The total coupling that occurs between that element and all the more distant elements is not large enough to greatly influence the shape of the impedance-versus-frequency curve, and as a result it is found that the bandwidth is not greatly reduced as the number of elements is increased beyond six.

However, certain difficulties are encountered in attempting to use large numbers of elements. One of these difficulties is that the interconnecting lengths of wire at both ends of the folded line produce cumulative errors in the phasing of the currents on the various elements. The total error increases directly with the total length of interconnecting wire, and this total length increases with the number of elements both because of the increase in the number of interconnections and because a larger number of elements requires a larger center conductor, hence longer interconnecting wires.

Two types of errors result from the presence of the interconnecting wires. Each of the interconnections adds half of its length to the effective physical lengths of the wires it joins. Since the interconnections are of various lengths, the effective physical lengths of the various elements are thus caused to differ from each other. This is the first type of error. In general, the interconnections to the opposite ends of a given element differ in length. This difference represents a shifting of the element forward or backward along the axis of the line. Since this difference is not the same for all elements the shifting is relative as well as absolute and gives rise to a second type of error.

According to this invention a special type of coil form is utilized in fabricating the folded transmission line from a single length of wire. Length compensation is a built-in feature of the coil form, which is illustrated in FIGURES 7–10. It consists of a polysymmetrical cylinder 10 (circular in this case) of dielectric material, with equispaced longitudinal slots 12 around the periphery into which the wire is wound. The ends of the cylinder are cuspated as at 14 by means of semicylindrical milling cuts normal to the axis of the cylinder. The radius of the milling cutter is equal to the radius of an imaginary circular cylinder containing the axes of the several wires. It can be seen by inspection of the figures that the half-length $X/2$ of jumper 2—3 will be exactly compensated for by the length reduction $\Delta L$. Similarly, the length reductions of the other elements will exactly compensate for the half-lengths of the corresponding interconnecting wires.

It will be noted that the interconnecting wires, the series connections at the ends of the active conductors at the top, that is, the jumpers between 2 and 3, and 4 and 5, are parallel to each other, and the jumpers at the bottom between 1 and 2, 3 and 4, and 5 and 6, are parallel to each other, but each of the top jumpers will form a 30-degree angle with every bottom jumper. That is, the axes of the semicylindrical milling cuts form a 30-degree angle with each other. This angle corresponds to 180 degrees divided by the number of elements which in this case is six.

The cuspated-cylinder coil form has an additional corrective feature. This feature is concerned with the difficulty encountered in attempting to use a large number of folded elements, namely, that as the number of elements increases the spacing between adjacent jumpers decreases if the line is wound about a right circular cylinder. This decreased spacing limits the wire diameter that can be employed. It also tends to compound the errors produced by the existence of large total lengths of uncompensated interconnecting wire, by causing the capacitance between adjacent jumpers to be very large.

By examining FIGURES 7–10 it can be seen that the crowding of the interconnecting wires which normally occurs with right-circular-cylinder coil forms does not occur in the illustrated cuspated-cylinder coil form. The spacing between all pairs of adjacent interconnections are equal and they are equal to the spacing between adjacent longitudinal elements. The gradation in the length of the longitudinal elements causes the interconnecting wires to be spread apart by an amount which exactly compensates for the crowding which would occur if the cylinder were not cuspated.

Practical embodiments of a squirrel-cage folded transmission line for use in time-delay applications can assume a variety of forms. They could be either rigid structures or flexible cables, wound as a single length of wire or formed from several lengths of wire or rod interconnected at the ends by means of jumper wires and suitably length compensated. The return conductor could be either an internal concentric cylinder, an external concentric tube or wire braid, or a set of wires or rods located partly or entirely between the active portions of the folded line. An external concentric tube may be used as an electromagnetic shield for the line. The elements themselves could be bare or insulated, embedded in a dielectric material or supported by means of insulating spacers.

Slight departures from cylindrical form could be utilized to obtain constructional advantages or to increase the electrical length. In fact, any multiwire cable in which the polysymmetry conditions are reasonably well satisfied could be embodied into a folded transmission line by interconnecting the elements as heretofore disclosed and adding the appropriate compensating reactors.

Figure 12:
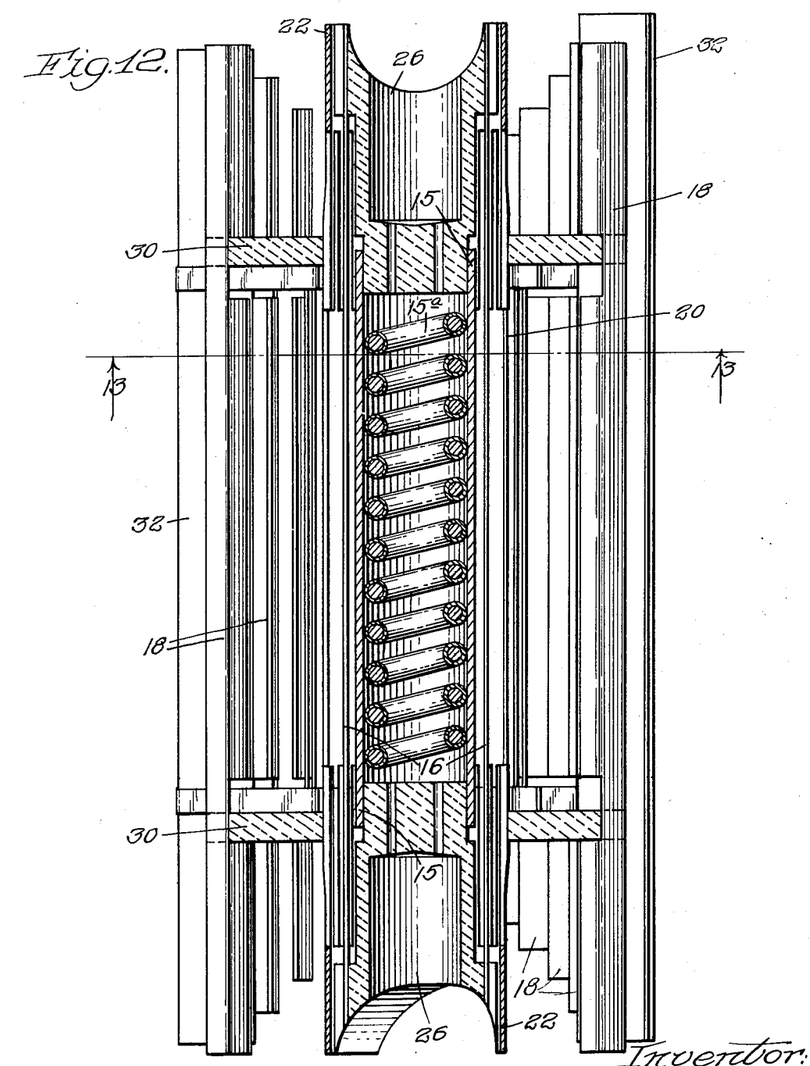
FIGURE 12 is a longitudinal section through approximately the center of a folded transmission-line electronic tube, along line 12—12 of FIGURE 13.
Figure 13:
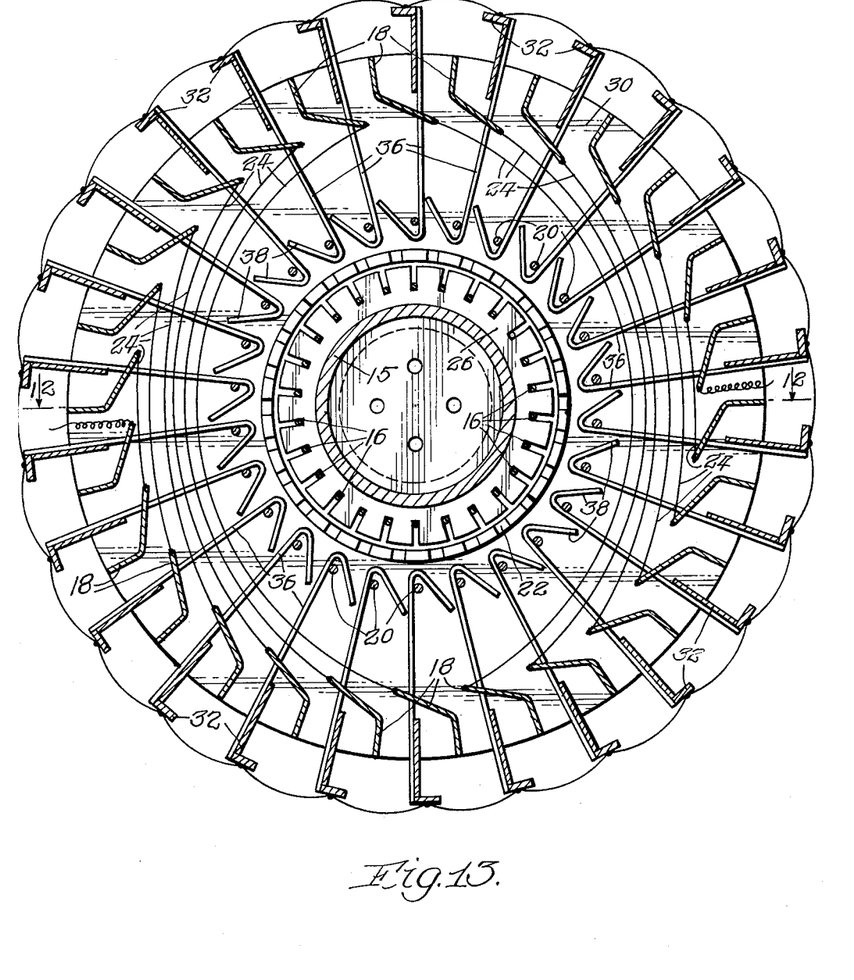
FIGURE 13 is a transverse section taken along line 13—13 of FIGURE 12.

A practical embodiment of a tetrode squirrel-cage folded transmission line electronic tube, intended for use as a power amplifier, is illustrated in FIGURES 12 and 13. Like ordinary tetrodes it contains four electrodes which serve the usual functions, that is, a cathode 15 heated by a heating element 15a, a control grid 16 which serves as the input electrode, a plate 18 which serves as the output electrode, and a screen or grid wires 20 which serve as an electrostatic shield between the input and output electrodes. In addition, the folded T-L tube contains a fifth electrode termed a "shield electrode," 32. Thus, following the conventional terminology the tube is a tetrode, even though it contains five elements. A suppressor grid could be added as an optional feature, in which case the tube would be called a pentode but would have six elements.

In addition to serving their usual electronic functions, the control grid and plate electrodes of the transmission-line tube also act as high-impedance transmission lines. Thus, in a folded transmission-line tube the grid and plate elements are high-impedance folded transmission lines.

The form represented in FIGURE 12 is a beam-power amplifier tube, that is, it is an amplifier in which a deliberate attempt is made to cause the electron flow to occur in smooth regular beams. The ordinary pentode vacuum tube in most common use employs control, screen, and suppressor grids of unequal pitches and the electron flow which occurs is quite haphazard; that is, in a wide variety of electron paths, many of which intersect each other in a very complicated manner. For ordinary applications at frequencies below 100 megacycles this sort of flow is not particularly disadvantageous, except that it gives rise to much larger screen-grid currents than would be obtained if the electron stream were focused in such a manner as to avoid the screen-grid wires. Screen dissipation is an important limiting factor in the design of power amplifier tubes but is of secondary importance in voltage amplifiers; consequently, at low frequencies beam formation is used only in power amplifiers. The beam feature also gives rise to other advantages, but they are principally concerned with efficacy of the device as a power amplifier.

The main reason for using a transmission-line tube as a beam power amplifier is that beam formation is a corollary feature of all squirrel-cage structures which satisfy the polysymmetry conditions. The various grids of a folded transmission-line tube cannot have various pitches, and therefore inherently obtain a certain measure of beam formation. Beam-power feature is of definite value in T-L tube power amplifiers and is a help rather than a hindrance at very high frequencies in that the electrons in the beam tend to contribute to the total amplifier gain in a cumulative manner.

The most important advantage of the beam-power feature in a transmission-line tube is that in principle it can produce a large transconductance between corresponding elements of grid line and plate line and practically no transconductance between elements which do not correspond. This is a desirable feature because it is the condition which is presumed to exist in analytical treatments of distributed amplifiers.

This is particularly true if the tube is designed in such a manner that all the flow lines of the beam interconnect points on the grid and plate lines which correspond to each other. This is accomplished in the present embodiment by constructing the grid and plate folded lines of the same number of elements with the same physical length per element. The grid and plate lines are aligned relative to each other so that the radial half-plane which passes through the center of each grid element also passes through the center of the corresponding plate element.

It is also desirable that most of the secondary electrons and reflected primary electrons which leave the plate be made to return to the plate near their respective points of origin.

The illustrated form of folded T-L tube is constructed as separate input and output folded transmission line assemblies. The input folded line is a grid-cathode assembly, consisting of a circular cathode sleeve 15 and a folded squirrel-cage grid 16 wound from a continuous length of fine grid wire around the coil form which is in two pieces as will be described. This assembly is placed inside a plate-shield-screen assembly which constitutes the output folded line. The plate is constructed as a squirrel cage of metal strips 18 which presents a large collecting surface to the impinging electron stream. These strips 18 are interconnected by means of end jumper wires 24 to form a folded line. The input and output folded lines are both length-compensated.

The grid transmission line tube utilizes the special form of the cuspated-cylinder coil form shown in FIGURES 7–10 except that the form comprises two spaced cuspated grooved end pieces or grid supports 26 around which the control grid 16 is wound, and the cathode cylinder 15, instead of one continuous piece 10. These ceramic parts serve three functions: (a) they serve as heat insulators between the cathode and the remainder of the tube, supporting the cathode without much loss of heat; (b) they accurately and automatically determine the very small critical spacing between the cathode and the grid wires; and (c) they support the grid wires in the desired length-compensated folded transmission line configuration.

Figure 11:
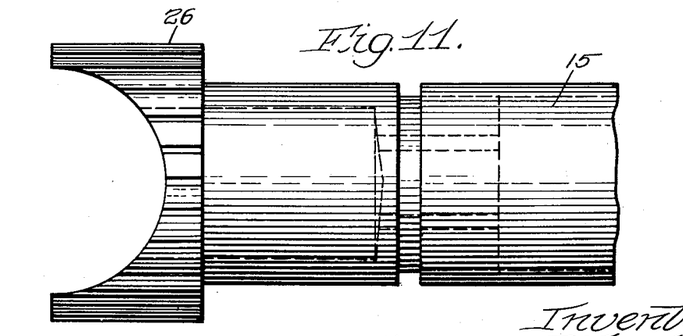
FIGURE 11 is a side elevation of a cuspated ceramic end grid support.

The central portions of the ceramic grid supports 26 are thin-wall tubes of the same outside diameter as the cathode. The inner ends of the ceramic supports are solid, and they are machined in such a manner that they can be plugged into the cathode so as to form with the cathode a single rigid structure. This machining consists of forming a shoulder the breadth of which equals the thickness of the cathode sleeve. The outer ends of the ceramic parts are formed in the same manner as the ends of the cuspated coil form 10 as shown in FIGURE 11. They are larger in diameter than the cathode by an amount slightly greater than four times the desired grid-cathode spacing. The diameter of the milling cutter used in forming the cusps is equal to the desired grid-circle diameter. The spacing between cathode and grid is determined by the depth of the slots into which the grid is wound; the radius from the axis of the ceramic parts to the bottoms of the slots is made equal to the sum of the cathode radius and the desired grid-cathode spacing, in other words equal to the grid-circle radius. Heater and cathode leads are brought out through axial holes in the solid inner ends of grid supports, passing between the interconnecting portions of the grid wires. It is necessary that these leads be rather thin so as not to disturb the fields in the vicinity of the grid wires. Equal spacings between elements should be maintained.

Proper tension in the grid wire must also be maintained. That is, it is necessary to wind the grid in such a manner that the cathode is free to expand when heated. Since the ceramic grid supports are not permitted to bear against the cathode, external forces must be applied to provide grid-wire tension.

This may be accomplished in the following manner. The coil form is prepared to receive the grid winding 16 by cementing the grid supports 26 into the cathode 15 by means of collodion or a similar material. Instead of butting the cathode snugly against the shoulders on the ceramic spacers, slight gaps are provided. These gaps are made large enough to accommodate the maximum elongation that the cathode will ever experience. The cement prevents the tension in the grid wires from closing the gaps in the process of winding the grid. After the grid is wound it is assembled into the tube, and springs (not shown) are attached between the grid spacers and fixed points external to the grid-cathode assembly. The collodion cement is automatically and completely removed in the process of baking-out and degassing the tube prior to activation of the cathode, that is, the collodion is completely evaporated in the baking-out process, and it leaves no residues or precipitates which can have any harmful effects on the cathode. Collodion is one of several materials used as binders in cathode coatings, any one of which materials can be used in place of collodion. After the cement is removed the total grid-wire tension assumes a value determined by the elongation of the springs.

Centering of the grid-cathode assembly inside the plate-shield-screen assembly is accomplished with the aid of the metal sleeves 22, called "grid shields." Like the ceramic grid supports 26, these grid shields are multiple-purpose parts: they serve to align the two folded line assemblies, to shield the ends of the input line so as to prevent feedback from the output line, to preserve the uniformity of the input transmission line beyond the ends of the cathode, and to prevent the electron beam from widening at the ends of the cathode.

The grid shields 22 are slipped over the ends of the completed grid-cathode assembly, and they cover all of the grid wire, except those portions above the cathode and between the cusps of the grid supports.

The diameter of the grid supports 26 is approximately equal to the cathode diameter plus four times the desired grid-cathode spacing. Thus, the distance between the grid wires and the inside surface of the grid shields is approximately equal to the distance between the grid wires and the outside surface of the cathode. The exact distance is chosen so as to match the distributed parameters of the shielded portion of the input line with those of the active portion. Thus the input line is made to consist of three multiple transmission lines in tandem, the center one having the cathode as its return conductor, and the outer ones having the grid shields as their return conductors. The grid shield 22 must, of course, be grounded to the cathode. For this reason it is necessary that leads be brought out from both ends of the cathode, whether the tube itself is to be single-ended (N even) or double-ended (N odd).

In order to make the heater and cathode leads more accessible, the shield is cuspated in the same manner as the grid-coil form, and the cusps are aligned with other. Improved shielding and enhanced uniformity of the grid line may be accomplished by closing the cuspated ends of the grid shield by means of semicylindrical pieces of metal having a radius of curvature equal to the cathode radius. In this manner the segments of grid wire between the cusps would be separated from the return conductor by the same amount as all other portions of the grid winding.

The plate folded transmission line utilizes two ceramic disks 30 to support and position the various elements. These disks are slotted in such a manner that the transmission line elements 18 can be rigidly affixed by pressing them into the slots, the elements being formed of sheet metal of the same thickness as the width of the slots. The spacing between disks is made somewhat greater than the electronically active length of the plate so that the disks do not obstruct the flow of electrons to the plate.

In order to allow the grid-cathode assembly to be slipped inside the plate-shield-screen assembly, holes slightly larger in diameter than the grid-cathode assembly are provided in the centers of the plate-support disks 30, and all the interconnecting jumper wires are attached so as to be entirely outside the cylinder determined by those holes.

The maximum outside diameter of the grid shield 22 is exactly equal to the diameter of the holes in the plate-support disks 30. To facilitate placing the grid-cathode assembly inside the plate-shield-screen assembly the edges of the holes are bevelled slightly, and the grid shield ends are spun slightly larger in diameter where they are to be in contact with the plate support disks. They are also slotted in order to accommodate thermal expansion without straining the plate supports.

Basically, the plate must be of a construction which intercepts all or nearly all of the primary emission. This requires that the plate elements be rather large and closely spaced. In order to obtain adequate screening between the grid and plate and in order to secure effective space-charge suppression of secondary electrons, it is necessary that the distance between the screen and the plate be fairly large. It is easily seen that a folded transmission line consisting of plate and screen grid elements only will have a much higher impedance and much lower bandwidth than the grid-cathode folded line, since the ratio of the distance between adjacent elements to the distance between each element and the common conductor is larger than unity for practical grid-cathode structures and much smaller than unity for practical plate-screen structures.

It is desirable in distributed amplifier applications to have equal input and output impedances so that like stages can be connected in tandem without the need for impedance-matching coupling networks. The impedance of a practical plate-screen folded transmission line could be reduced to any desired lower value by enclosing the plate elements in a circular metal tube (not shown) connected to the screen grid. The presence of this tube would tend to multiply all of the distributed self and mutual capacitances by the same factor, say K. At the same time it would reduce all of the self and mutual inductances by a factor $1/K$. Therefore, the impedance would be reduced by a factor $1/K$, since impedance varies with the square root of the ratio of inductance to capacitance. However, the bandwidth would be increased only slightly, since it is a function of the ratios of mutual inductance to self-inductant, and those ratios are almost invariant. The slight increase in bandwidth is traceable to the fact that the metal tube would have some shielding effects which would tend to decouple the plate elements from each other.

It is preferred to decrease the plate-line impedance by trading that impedance for bandwidth, in a manner of speaking, by means of a form of "shield electrode," consisting of polysymmetrical squirrel-cage elements 32, all connected to each other and to the screen grid 20. These elements partially shield the plate elements from each other.

The shape and configuration of the plate and shield elements of the preferred embodiment is most clearly shown in FIGURE 12. As shown in cross section, the plate elements are V-shaped with an included angle of 120 degrees, and the shield elements are L-shaped. They are arranged in a configuration which resembles a turbine. Radial projections of the plate elements on the cathode cylinder form a set of overlapping rectangles. Therefore, the vast majority of primary electrons which follow nearly radial paths will all strike the plate elements. The space charge in the screen-plate region will repel the secondary emission back to the plate.

The plate and shield elements are of various lengths which are determined in part by the lengths of the interconnecting end jumper wires 24, taking into account the fact that some of the jumpers have to be somewhat longer than the straight-line distance between the points they interconnect, because they have to avoid the central region reserved for the grid-cathode structure. Corresponding screen and shield elements are joined by metal strips 36 so as to form shield-screen sub-assemblies. The screen-circle diameter is determined by the spacing between the screen wires 20 and the shield elements 32 on each of these sub-assemblies. Each of the metal strips 36 connecting the shield and screen is bent to form a short V-shaped tab 38 immediately below the screen wire. These tabs are of the correct length so that when the sub-assemblies are all pressed into the plate-support disk, the tip of each tab just touches the neighboring element. Thus, the tabs form a closed circle which prevents any of the screen wires from deflecting or vibrating in the azimuthal direction. Also each of the screen-grid wires is located in the same radial plane as the corresponding control-grid wire, so that the electron beam passes between the screen wires, as is desired in beam-power tubes.

The folded transmission-line tube is connected to external circuitry in the same fashion as any other embodiment of a transmission-line tube, except for the inclusion of compensating inductors in series with both ends of the grid and plate-folded transmission lines. Conventional ultra-high-frequency amplifier tubes have to be provided with extremely short low-inductance leads, because lead inductance is a parasitic element in ordinary amplifier circuits. Since a certain amount of series inductance is required in the folded T-L tube, part or all of that inductance can be obtained as lead-wire inductance, thereby minimizing the problems usually associated with lead-wire inductance.

It follows from the foregoing that the invention has provided definite advantages when employed as a transmission line and also when employed as a transmission-line tube as follows:

(1) Increased impedance
(2) Constant electrical length
(3) Long, constant electrical length in a very small space
(4) Large bandwith
(5) Large impedance-bandwith compared with helix (broadband applications)
(6) Single mode of propagation
(7) Mathematical simplicity
(8) Structural simplicity
(9) Operation in harmonic bands (periodic nature of $R_0$ and $X_c$)
(10) Single-ended or double ended
(11) Increased gain-bandwith
(12) Higher impedance levels, less total transconductance required
(13) 100% utilization of cathode emission
(14) Beam-power feature at U.H.F.
(15) Small loss of cathode heat by conduction Obviously changes may be made in the details of construction and/or circuitry without departing from the spirit and scope of the invention as defined in the appended claims. In fact, any multiwire cable in which the polysymmetry conditions are reasonably well satisfied could be converted into a folded transmission line by interconnecting the elements according to this application and adding the appropriate compensating reactors.

I claim:

1. An electronic tube structure having cathode, grid and plate electrodes, the cathode being centrally positioned relative to the grid and plate electrodes and the cathode, grid and plate electrodes respectively being adapted to produce, control and collect an electron stream, one of said electrodes being in the form of a folded transmission line including electrically series connected physically parallel arranged conductors, the folded transmission line being symmetrically located relative to the central cathode.

2. An electronic tube structure having cathode, grid and plate electrodes, the cathode being centrally positioned relative to the grid and plate electrodes and the cathode, grid and plate electrodes respectively being adapted to produce, control and collect an electron stream, said grid electrode being in the form of a folded transmission line including electrically series connected physicall parallel arranged conductors, the folded transmission line being symmetrically located relative to the central cathode.

3. An electronic tube structure having cathode, grid and plate electrodes, the cathode being centrally positioned relative to the grid and plate electrodes and the cathode, grid and plate electrodes respectively being adapted to produce, control and collect an electron stream, said plate electrode being in the form of a folded transmission line including electrically series connected physically parallel arranged conductors, the folded transmission line being symmetrically located relative to the central cathode.

4. An electronic tube structure having cathode, grid and plate electrodes, said grid and plate electrodes each being in the form of a polysymmetrical folded transmission line including electrically series connected physically parallel arranged conductors.

5. A transmission line electronic tube comprising spaced slotted cuspated cylinders of dielectric material, a grid wound upon said cylinders in the slots thereof, said grid comprising a polysymmetrical folded transmission line formed of a plurality of conductive elements arranged parallel to the axis of said cylinders and connected electrically in series by end connections, an electron emitting cathode disposed longitudinally between said cylinders and parallel to the longitudinal axis thereof, and plate electrodes surrounding said grid elements.

6. An electron tube as defined in claim 5 wherein the parallel conductors are symmetrically arranged about the cathode.

7. A transmission line electronic tube as defined in claim 5 wherein said cylinders have cuspated ends and said end connections extend across said cuspated ends.

8. An electronic tube as defined in claim 7 wherein the parallel conductors are symmetrically arranged about the cathode.

9. An electronic tube structure having a cathode, a control grid, a screen grid surrounding said control grid, plate electrodes, said control grid and plate electrodes each being in the form of electrically series connected physically parallel arranged conductors disposed as a polysymmetrical squirrel cage around said cathode, and shield electrode elements also arranged as a polysymmetrical squirrel cage about said cathode and electrically connected to each other and to said screen grid and arranged to shield the plate elements from each other.

10. A single wire squirrel-cage folded transmission line having constant velocity comprising a plurality of active conductor portions arranged in parallel relation physically and connected at their ends in series electrically and having the output and input terminals at the ends of the line and a linear conductor centrally and symmetrically positioned relative to the said active conductor portions.

11. A folded transmission line as defined in claim 10 wherein the output and input terminals are at one end of the line only.

12. A folded transmission line as defined in claim 11 comprising, in addition, means consisting of varying lengths of the active conductor portions for compensating for the various lengths of the end connections.

13. A folded transmission line as defined in claim 11 wherein said conductors are all of the same cross-sectional size.

14. A folded transmission line as defined in claim 11 wherein compensating means comprising reactor elements are connected with the ends of the folded transmission line, one reactor being connected between the input terminal and one extremity of the folded transmission line and the other reactor being connected between the other extremity of the folded transmission line and the output terminal whereby said line has equal and real input and output characteristic impedances and has a constant electrical length equal to the total length of its series connected active conductor portions.

References Cited in the file of this patent

UNITED STATES PATENTS

| | | |
|---|---|---|
| 2,163,750 | D'Heedene | June 27, 1939 |
| 2,280,728 | Streib | Apr. 21, 1942 |
| 2,396,708 | Leeds | Mar. 19, 1946 |
| 2,398,608 | Werner et al. | Apr. 16, 1946 |
| 2,439,512 | Hallmark | Apr. 13, 1948 |
| 2,458,577 | Evans | Jan. 11, 1949 |
| 2,462,410 | Lindenblad | Feb. 22, 1949 |
| 2,503,955 | Lindenblad | Apr. 11, 1950 |
| 2,589,397 | Koehler | Mar. 18, 1952 |
| 2,639,312 | Kerwin | May 19, 1953 |
| 2,695,372 | Lawrence | Nov. 23, 1954 |
| 2,723,302 | Cresson | Nov. 8, 1955 |
| 2,813,221 | Peter | Nov. 12, 1957 |
| 2,896,117 | Birdsall et al. | July 21, 1959 |